US012142173B2

(12) United States Patent
Lee et al.

(10) Patent No.: US 12,142,173 B2
(45) Date of Patent: Nov. 12, 2024

(54) DISPLAY DEVICE

(71) Applicant: Samsung Display Co., LTD., Yongin-si (KR)

(72) Inventors: Jaehoon Lee, Seoul (KR); Jong Wook Kim, Seoul (KR)

(73) Assignee: Samsung Display Co., Ltd., Yongin-si (KR)

(*) Notice: Subject to any disclaimer, the term of this patent is extended or adjusted under 35 U.S.C. 154(b) by 0 days.

(21) Appl. No.: 18/211,189

(22) Filed: Jun. 16, 2023

(65) Prior Publication Data

US 2023/0410701 A1 Dec. 21, 2023

(30) Foreign Application Priority Data

Jun. 17, 2022 (KR) ........................ 10-2022-0074144

(51) Int. Cl.
*G09G 3/00* (2006.01)
*G09G 5/37* (2006.01)

(52) U.S. Cl.
CPC ............... *G09G 3/006* (2013.01); *G09G 5/37* (2013.01); *G09G 2320/041* (2013.01)

(58) Field of Classification Search
CPC ..... G09G 3/006; G09G 5/37; G09G 2320/041
See application file for complete search history.

(56) References Cited

U.S. PATENT DOCUMENTS

2017/0236490 A1* 8/2017 Cheon ...................... G09G 5/10
345/691
2018/0286349 A1* 10/2018 Mohammadi ............ G09G 3/20

FOREIGN PATENT DOCUMENTS

| | | |
|---|---|---|
| JP | 2009-53629 | 3/2009 |
| KR | 10-2014-0078919 | 6/2014 |
| KR | 10-2015-0019025 | 2/2015 |
| KR | 10-2015-0062968 | 6/2015 |
| KR | 10-2016-0066100 | 6/2016 |
| KR | 10-2017-0087559 | 7/2017 |
| KR | 10-2017-0097253 | 8/2017 |
| KR | 10-2019-0027689 | 3/2019 |
| KR | 10-2215204 B1 | 2/2021 |

* cited by examiner

*Primary Examiner* — Peter D McLoone
(74) *Attorney, Agent, or Firm* — Lewis Roca Rothgerber Christie LLP

(57) ABSTRACT

A display device determines a target temperature based on an average luminance of each of the panel blocks, calculates a temperature change amount of each of the panel blocks by multiplying a difference between the target temperature and a previous prediction temperature of each of the panel blocks determined before a reference period by a block temperature coefficient of the panel blocks, and calculates a current prediction temperature of each of the panel blocks by adding the temperature change amount of each of the panel blocks to the previous prediction temperature of each of the panel blocks, the panel blocks include a first panel block and second panel blocks adjacent to the first panel block, and the block temperature coefficient of the first panel block is determined based on the target temperature of the first panel block and the target temperature of each of the second panel blocks.

20 Claims, 9 Drawing Sheets

LPF

| | x1 | x2 | x3 | x4 | x5 |
|---|---|---|---|---|---|
| y1 | 1 | 1 | 1 | 1 | 1 |
| y2 | 1 | 3 | 3 | 3 | 1 |
| y3 | 1 | 3 | 5 | 3 | 1 |
| y4 | 1 | 3 | 3 | 3 | 1 |
| y5 | 1 | 1 | 1 | 1 | 1 |

X 1/45

DISPLAY DEVICE

CROSS-REFERENCE TO RELATED APPLICATION

This application claims priority to and the benefit of Korean Patent Application No. 10-2022-0074144, filed on Jun. 17, 2022 in the Korean Intellectual Property Office KIPO, the content of which is herein incorporated by reference in its entirety.

BACKGROUND

1. Field

Embodiments of the present disclosure relate to a display device. More particularly, embodiments of the present disclosure relate to a display device predicting temperature.

2. Description of the Related Art

Generally, a display device may include a display panel, a timing controller, a gate driver, and a data driver. The display panel may include a plurality of gate lines, a plurality of data lines, and a plurality of pixels electrically connected to the gate lines and the data lines. The gate driver may provide gate signals to the gate lines. The data driver may provide data voltages to the data lines. The timing controller may control the gate driver and the data driver.

A luminance of image displayed on the display device may be affected by a temperature of the display panel. However, because the temperature of the display panel is not substantially uniform in all portions, a difference in the luminance may occur for each position of the display panel. Accordingly, in order to reduce the difference in the luminance, the display device may have a device or circuit to predict the temperature of the display panel based on input image data.

However, the temperature at each position of the display panel may be affected by heat transfer (i.e., Newton's law of cooling). Therefore, when the temperature is predicted without considering an effect of the heat transfer, an accuracy of the predicted temperature may be reduced.

SUMMARY

Aspects of embodiments are directed toward a display device that predicts a temperature in consideration of heat transfer.

According to embodiments of the present disclosure, a display device may include a display panel including panel blocks (e.g., panel circuits), and a timing controller (e.g., a timing control circuit) configured to determine a target temperature of each of the panel blocks based on an average luminance of each of the panel blocks, to calculate a temperature change amount of each of the panel blocks by multiplying a difference between the target temperature of each of the panel blocks and a previous prediction temperature of each of the panel blocks determined before a reference period by a block temperature coefficient of the panel blocks, to calculate a current prediction temperature of each of the panel blocks by adding the temperature change amount of each of the panel blocks to the previous prediction temperature of each of the panel blocks, and to compensate for input image data based on the current prediction temperature of each of the panel blocks, the panel blocks may include a first panel block (e.g., a first panel circuit) and plural second panel blocks (e.g., second panel circuits) adjacent to the first panel block, and the block temperature coefficient of the first panel block may be determined based on the target temperature of the first panel block and the target temperature of each of the second panel blocks.

In an embodiment, the block temperature coefficient of the first panel block may increase as a difference between the target temperature of the first panel block and the target temperature of each of the second panel blocks increases.

In an embodiment, the panel blocks may further include third panel blocks different from the first panel block and adjacent to the second panel blocks, and the block temperature coefficient of the first panel block may be determined based on the target temperature of the first panel block, the target temperature of each of the second panel blocks, and the target temperature of each of the third panel blocks.

In an embodiment, the block temperature coefficient of the first panel block may increase as a difference between the target temperature of the first panel block and the target temperature of each of the second panel blocks increases, and the block temperature coefficient of the first panel block increase as a difference between the target temperature of the first panel block and the target temperature of each of the third panel blocks increases.

In an embodiment, the timing controller may be configured to calculate a preliminary temperature change amount of each of the panel blocks by multiplying a difference between the target temperature of each of the panel blocks and the previous prediction temperature of each of the panel blocks by a preset global temperature coefficient, to calculate a preliminary prediction temperature of each of the panel blocks by adding the preliminary temperature change amount of each of the panel blocks to the previous prediction temperature of each of the panel blocks, and to determine the block temperature coefficient of each of the panel blocks based on the preliminary prediction temperature of each of the panel blocks.

In an embodiment, the block temperature coefficient of the first panel block may be determined based on the preliminary prediction temperature of the first panel block and the preliminary prediction temperature of each of the second panel blocks.

In an embodiment, the block temperature coefficient of the first panel block may increase as a difference between the preliminary prediction temperature of the first panel block and the preliminary prediction temperature of each of the second panel blocks increases.

In an embodiment, the panel blocks may further include third panel blocks different from the first panel block and adjacent to the second panel blocks, and the block temperature coefficient of the first panel block may be determined based on the preliminary prediction temperature of the first panel block, the preliminary prediction temperature of each of the second panel blocks, and the preliminary prediction temperature of each of the third panel blocks.

In an embodiment, the block temperature coefficient of the first panel block may increase as a difference between the preliminary prediction temperature of the first panel block and the preliminary prediction temperature of each of the second panel blocks increases, and the block temperature coefficient of the first panel block may increase as a difference between the preliminary prediction temperature of the first panel block and the preliminary prediction temperature of each of the third panel blocks increases.

In an embodiment, the timing controller may be configured to store an accumulated deterioration amount generated by accumulating a deterioration amount of each of the panel blocks according to grayscale values of the input image data, and the average luminance may increase as a change amount of the accumulated deterioration amount during the reference period increases.

In an embodiment, the timing controller may be configured to determine the target temperature utilizing a target temperature lookup table including the target temperature corresponding to the average luminance.

In an embodiment, the timing controller may be configured to apply a low pass filter to the target temperature.

In an embodiment, the display device may further include a temperature sensor (e.g., a temperature sensor circuit) configured to sense an ambient temperature of the display panel, and the timing controller may be configured to calculate a final prediction temperature by adding the current prediction temperature of each of the panel blocks to the ambient temperature, and to compensate for the input image data based on the final prediction temperature.

According to embodiments of the present disclosure, a display device may include a display panel including panel blocks, and a timing controller configured to determine a target temperature of each of the panel blocks based on an average luminance of each of the panel blocks, to calculate a temperature change amount of each of the panel blocks by multiplying a difference between the target temperature of each of the panel blocks and a previous prediction temperature of each of the panel blocks determined before a reference period by a block temperature coefficient of the panel blocks, to calculate a current prediction temperature of each of the panel blocks by adding the temperature change amount of each of the panel blocks to the previous prediction temperature of each of the panel blocks, and to compensate for input image data based on the current prediction temperature of each of the panel blocks, the panel blocks may include a first panel block and second panel blocks included in a range of a low pass filter when the low pass filter is applied to the first panel block, and the block temperature coefficient of the first panel block may be determined based on the target temperature of the first panel block and the target temperature of each of the second panel blocks.

In an embodiment, the timing controller may be configured to calculate a preliminary temperature change amount of each of the panel blocks by multiplying a difference between the target temperature of each of the panel blocks and the previous prediction temperature of each of the panel blocks by a preset global temperature coefficient, to calculate a preliminary prediction temperature of each of the panel blocks by adding the preliminary temperature change amount of each of the panel blocks to the previous prediction temperature of each of the panel blocks, and to determine the block temperature coefficient of each of the panel blocks based on the preliminary prediction temperature of each of the panel blocks.

In an embodiment, the block temperature coefficient of the first panel block may be determined based on the preliminary prediction temperature of the first panel block and the preliminary prediction temperature of each of the second panel blocks.

In an embodiment, the timing controller may be configured to generate a first preliminary temperature coefficient for each of the second panel blocks having the preliminary prediction temperature equal to or higher than the preliminary prediction temperature of the first panel block utilizing an equation $$PTC1 = K \times \frac{PPT2}{PPT1} \times \frac{LPF}{MLPF},$$

the timing controller may be configured to generate a second preliminary temperature coefficient for each of the second panel blocks having the preliminary prediction temperature lower than the preliminary prediction temperature of the first panel block utilizing an equation $$PTC2 = K \times \frac{PPT1}{PPT2} \times \frac{LPF}{MLPF},$$

and the timing controller may be configured to calculate the block temperature coefficient of the first panel block by summing the first preliminary temperature coefficient and the second preliminary temperature coefficient, where PTC1 may be the first preliminary temperature coefficient, PTC2 may be the second preliminary temperature coefficient, K may be the global temperature coefficient, and LPF may be a filter value applied to each of the second panel blocks among filter values of the low pass filter, and MLPF may be a maximum value among the filter values of the low pass filter.

In an embodiment, the timing controller may be configured to store an accumulated deterioration amount generated by accumulating a deterioration amount of each of the panel blocks according to grayscale values of the input image data, and the average luminance may increase as a change amount of the accumulated deterioration amount during the reference period increases.

In an embodiment, the timing controller may be configured to determine the target temperature utilizing a target temperature lookup table including the target temperature corresponding to the average luminance.

In an embodiment, the timing controller may be configured to apply the low pass filter to the target temperature.

Therefore, the display device (e.g., the circuits of the display device) may predict a temperature of a display panel in consideration of heat transfer by determining a target temperature of each of the panel blocks based on an average luminance of each of the panel blocks, calculating a temperature change amount of each of the panel blocks by multiplying a difference between the target temperature of each of the panel blocks and a previous prediction temperature of each of the panel blocks determined before a reference period by a block temperature coefficient of the panel blocks, to calculating a current prediction temperature of each of the panel blocks by adding the temperature change amount of each of the panel blocks to the previous prediction temperature of each of the panel blocks, compensating for input image data based on the current prediction temperature of each of the panel blocks, including a first panel block and second panel blocks adjacent to the first panel block in the panel blocks, and determining the block temperature coefficient of the first panel block based on the target temperature of the first panel block and the target temperature of each of the second panel blocks.

In some embodiments, the display device (e.g., the circuits of the display device) may predict a temperature of a display panel through a low pass filter by including a first panel block and second panel blocks included in a range of a low pass filter when the low pass filter is applied to the first panel block in the panel blocks, and determining the block temperature coefficient of the first panel block based on the target temperature of the first panel block and the target temperature of each of the second panel blocks. And, the display device may predict the temperature of the display panel in consideration of heat transfer.

However, the effects of the present disclosure are not limited to the above-described effects, and may be variously expanded without departing from the spirit and scope of the present disclosure.

DETAILED DESCRIPTION

Hereinafter, the present disclosure will be explained in more detail with reference to the accompanying drawings.

Figure 1:
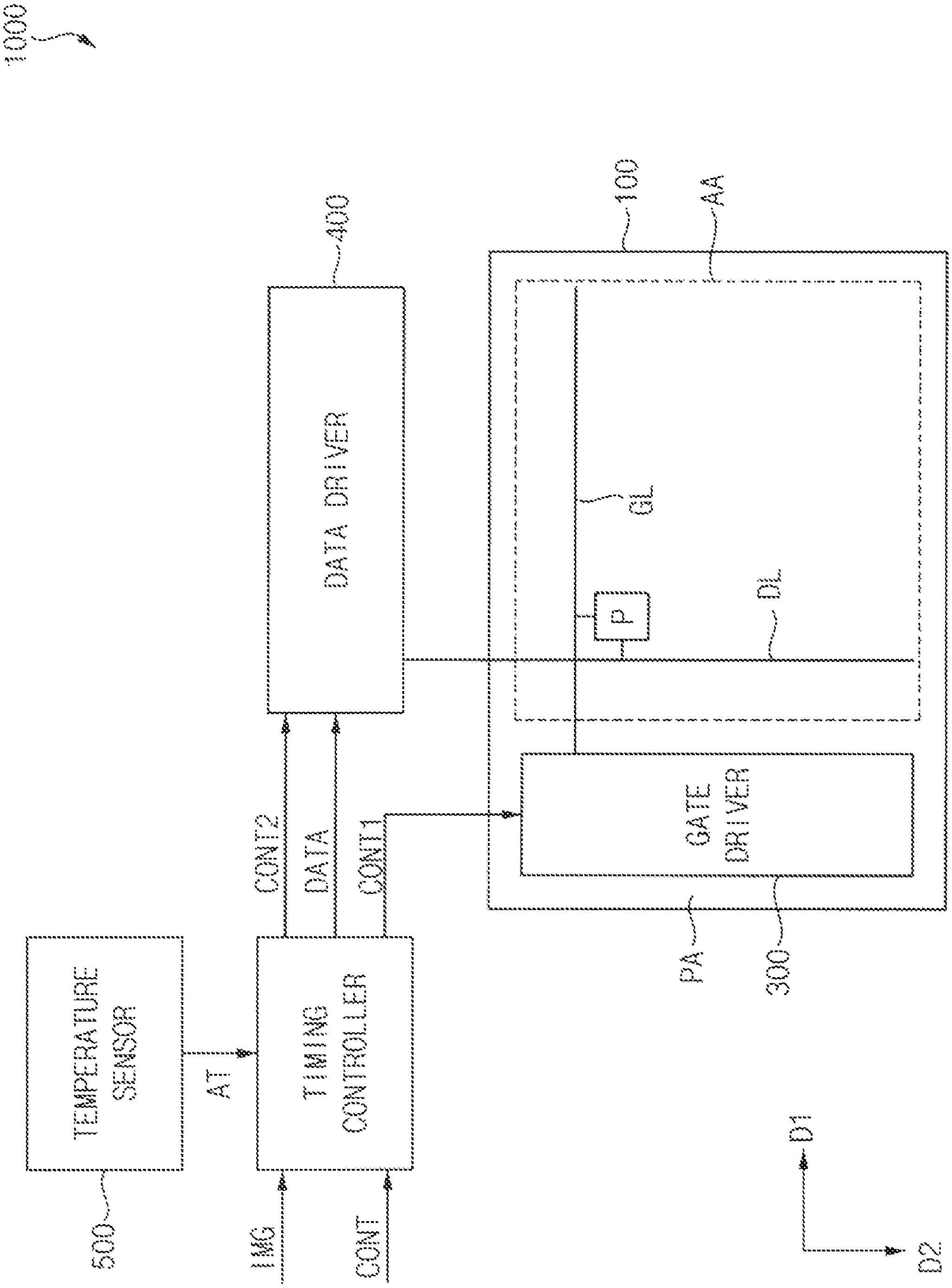
FIG. 1 is a block diagram illustrating a display device according to embodiments of the present disclosure.

FIG. 1 is a block diagram illustrating a display device 1000 according to embodiments of the present disclosure.

Referring to FIG. 1, the display device 1000 may include a display panel 100, a timing controller (e.g., a timing control circuit) 200, a gate driver 300, a data driver 400, a temperature sensor (e.g., a temperature sensor circuit) 500. In an embodiment, the timing controller 200 and the data driver 400 may be integrated into one chip (e.g., may be parts of an integrated circuit).

The display panel 100 has a display region AA on which an image is displayed and a peripheral region PA adjacent to the display region AA. In an embodiment, the gate driver 300 may be mounted on the peripheral region PA of the display panel 100.

The display panel 100 may include a plurality of gate lines GL, a plurality of data lines DL, and a plurality of pixels P electrically connected to the data lines DL and the gate lines GL. The gate lines GL may extend in a first direction D1 and the data lines DL may extend in a second direction D2 crossing the first direction D1.

The timing controller 200 may receive input image data IMG and an input control signal CONT from a host processor (e.g., a graphic processing unit; GPU). For example, the input image data IMG may include red image data, green image data and blue image data. In an embodiment, the input image data IMG may further include white image data. For another example, the input image data IMG may include magenta image data, yellow image data, and cyan image data. The input control signal CONT may include a master clock signal and a data enable signal. The input control signal CONT may further include a vertical synchronizing signal and a horizontal synchronizing signal.

The timing controller 200 may generate a first control signal CONT1, a second control signal CONT2, and data signal DATA based on the input image data IMG and the input control signal CONT.

The timing controller 200 may generate the first control signal CONT1 for controlling operation of the gate driver 300 based on the input control signal CONT and output the first control signal CONT1 to the gate driver 300. The first control signal CONT1 may include a vertical start signal and a gate clock signal.

The timing controller 200 may generate the second control signal CONT2 for controlling operation of the data driver 400 based on the input control signal CONT and output the second control signal CONT2 to the data driver 400. The second control signal CONT2 may include a horizontal start signal and a load signal.

The timing controller 200 may receive the input image data IMG and the input control signal CONT, and generate the data signal DATA. The timing controller 200 may output the data signal DATA to the data driver 400.

The gate driver 300 may generate gate signals for driving the gate lines GL in response to the first control signal CONT1 input from the timing controller 200. The gate driver 300 may output the gate signals to the gate lines GL. For example, the gate driver 300 may sequentially output the gate signals to the gate lines GL.

The data driver 400 may receive the second control signal CONT2 and the data signal DATA from the timing controller 200. The data driver 400 may convert the data signal DATA into data voltages having an analog type or kind. The data driver 400 may output the data voltages to the data lines DL.

The temperature sensor 500 may sense an ambient temperature AT of the display panel 100. The temperature sensor 500 may output the ambient temperature AT to the timing controller 200. In an embodiment, the timing controller 200 may compensate for the ambient temperature AT so that a temperature of the display panel 100 when the display panel 100 displays a black image and the ambient temperature AT may each independently be the same. The timing controller 200 may calculate a final prediction temperature based on the ambient temperature AT. A detailed description thereof will be given later.

Figure 2:
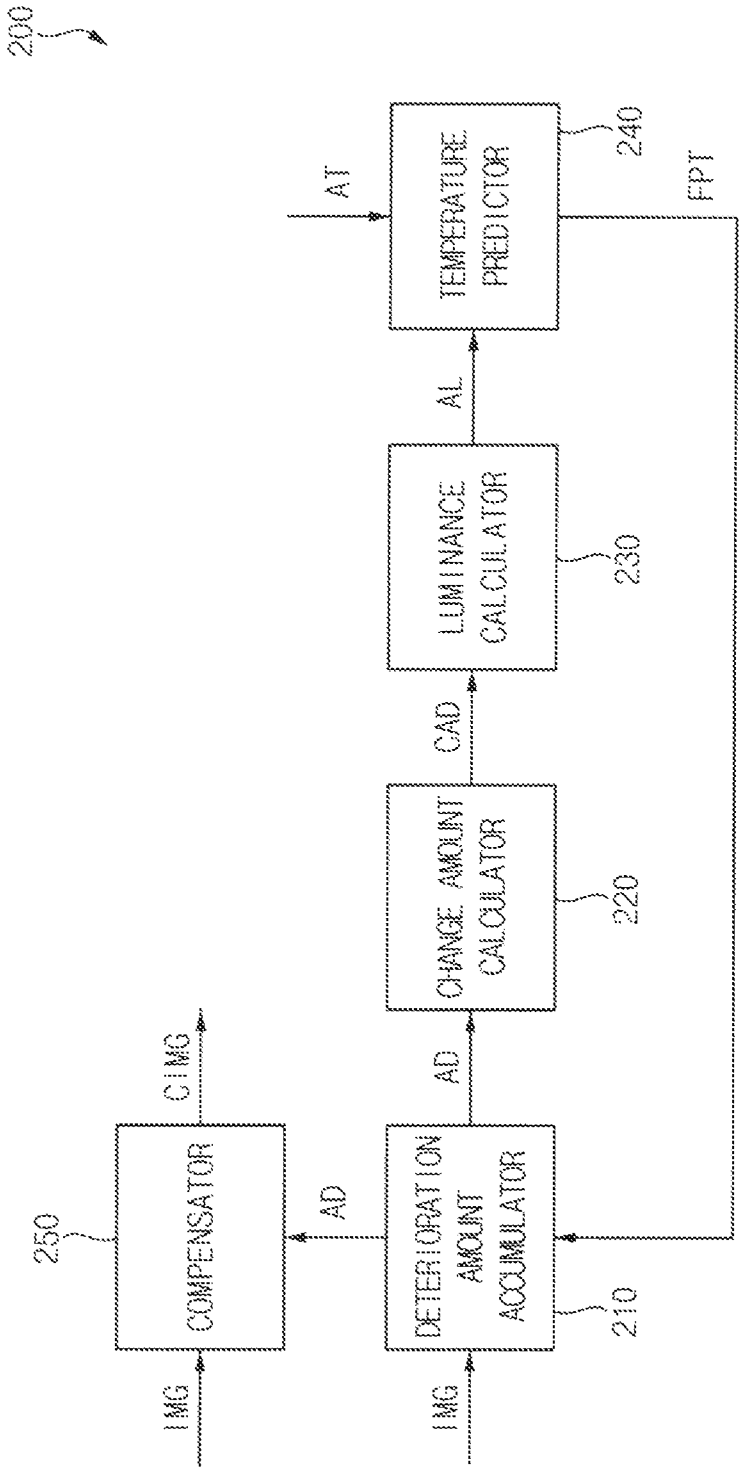
FIG. 2 is a diagram illustrating an example of a timing controller of the display device of FIG. 1 according to an embodiment of the present disclosure.
Figure 3:
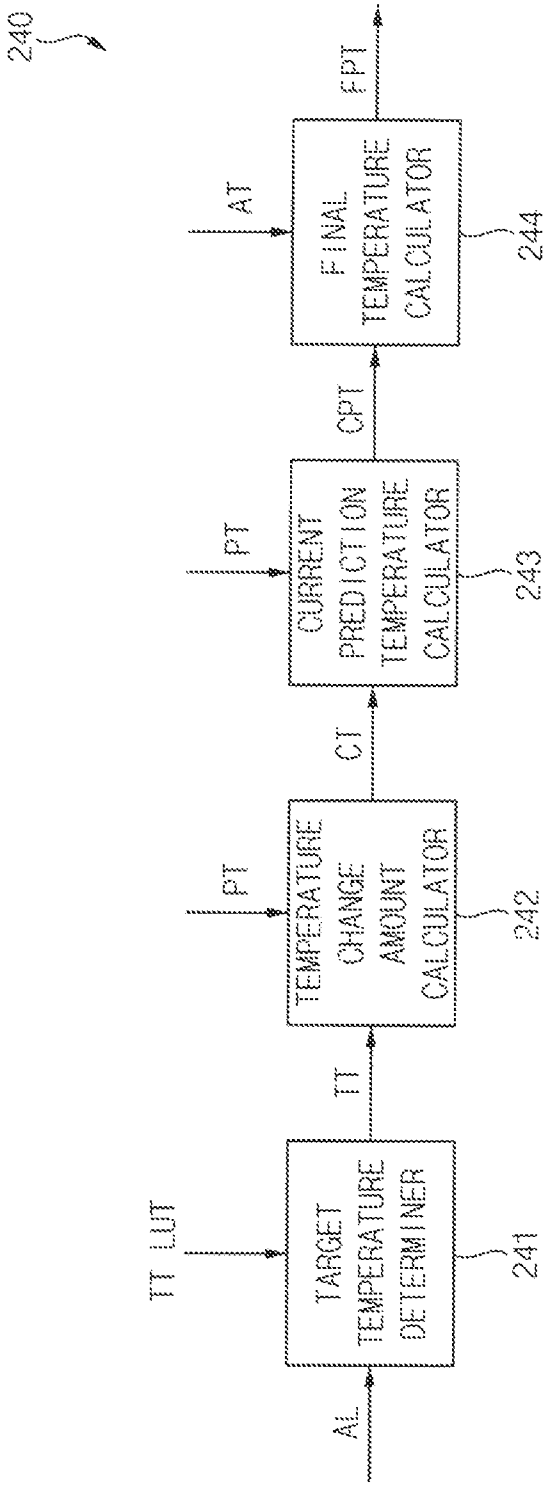
FIG. 3 is a diagram illustrating an example of a temperature predictor of the display device of FIG. 1 according to an embodiment of the present disclosure.

FIG. 2 is a diagram illustrating an example of the timing controller 200 of the display device 1000 of FIG. 1, and FIG. 3 is a diagram illustrating an example of a temperature predictor 240 of the display device 1000 of FIG. 1.

Referring to FIGS. 1 to 3, the timing controller 200 may determine a target temperature TT of each of panel blocks (e.g., panel block circuits) based on an average luminance AL of each of the panel blocks, calculate a temperature change amount CT of each of the panel blocks by multiplying a difference between the target temperature TT of each of the panel blocks and a previous prediction temperature PT of each of the panel blocks determined before a reference period by a block temperature coefficient of the panel blocks, calculate a current prediction temperature CPT of each of the panel blocks by adding the temperature change amount CT of each of the panel blocks to the previous prediction temperature PT of each of the panel blocks, and compensate for the input image data IMG based on the current prediction temperature CPT of each of the panel blocks.

The display panel 100 may include the pixels P divided into panel blocks. For example, one panel block may include the plurality of pixels P. For example, the display panel 100 may include the plurality of panel blocks.

The timing controller 200 may calculate a current prediction temperature for each of the panel blocks for each reference period. The timing controller 200 may calculate a final prediction temperature by adding the current prediction temperature of each of the panel blocks to the ambient temperature AT. The timing controller 200 may predict a temperature of the display panel 100 as the final prediction temperature.

The timing controller 200 may include a deterioration amount accumulator (e.g., a deterioration amount accumulator circuit) 210, a change amount calculator (e.g., a change amount calculator circuit) 220, a luminance calculator (e.g., a luminance calculator circuit) 230, a temperature predictor (e.g., a temperature predictor circuit) 240, and a compensator (e.g., a compensator circuit) 250.

In an embodiment, the deterioration amount accumulator 210 may store an accumulated deterioration amount AD generated by accumulating a deterioration amount of each of the panel blocks according to grayscale values of the input image data IMG. For example, the deterioration amount accumulator 210 may calculate the deterioration amount by multiplying the grayscale values of the input image data IMG by a deterioration grayscale coefficient for each of the grayscale values. For example, the deterioration grayscale coefficient may have preset values according to the grayscale values.

In another embodiment, the deterioration amount accumulator 210 may calculate a grayscale deterioration amount by multiplying the grayscale values of the input image data IMG by the deterioration grayscale coefficient for each of the grayscale values, calculate a temperature deterioration amount by multiplying the final prediction temperature FPT by a preset deterioration temperature coefficient, and calculate the deterioration amount by multiplying the grayscale deterioration amount and the temperature deterioration amount. At this time, when the current prediction temperature CPT of each of the panel blocks is calculated, the deterioration amount accumulator 210 may utilize the previous prediction temperature PT of each of the panel blocks to calculate the deterioration amount and the accumulated deterioration amount AD, and update the deterioration amount and the accumulated deterioration amount AD after the current prediction temperature CPT of each of the panel blocks is calculated.

The change amount calculator 220 may store the accumulated deterioration amount AD before the reference period. The change amount calculator 220 may calculate the change amount CAD of the accumulated deterioration amount AD during the reference period.

The luminance calculator 230 may determine the average luminance AL based on the change amount CAD of the accumulated deterioration amount AD. For example, the luminance calculator 230 may determine the average luminance AL of each of the panel blocks during the reference period.

The average luminance AL may increase as the change amount CAD of the accumulated deterioration AD during the reference period increases. Accordingly, the luminance calculator 230 may calculate the average luminance AL by utilizing the change amount CAD of the accumulated deterioration amount AD.

The temperature predictor 240 may calculate the final prediction temperature FPT based on the average luminance AL and the ambient temperature AT. The temperature predictor 240 may output the final prediction temperature FPT to the deterioration amount accumulator 210. A detailed description thereof will be given later.

The compensator 250 may compensate for the input image data IMG based on the accumulated deterioration amount AD. A luminance of image may be distorted according to a degree of deterioration of the display panel 100. Accordingly, the compensator 250 may compensate for the deterioration of the display panel 100 (i.e., deterioration of the pixels P) through the accumulated deterioration amount AD.

Referring to FIG. 3, the temperature predictor 240 may include a target temperature determiner (e.g., a target temperature determiner circuit) 241, a temperature change amount calculator (e.g., a temperature change amount calculator circuit) 242, a current prediction temperature calculator (e.g., a current prediction temperature calculator circuit) 243, and a final temperature calculator (e.g., a final temperature calculator circuit) 244.

The target temperature determiner 241 may determine the target temperature TT of each of the panel blocks based on the average luminance AL of each of the panel blocks. The target temperature determiner 241 may determine the target temperature TT of each of the panel blocks by utilizing a target temperature lookup table TT LUT including the target temperature TT corresponding to the average luminance AL. For example, the target temperature TT of each of the panel blocks may be higher as the average luminance AL increases.

In an embodiment, the target temperature determiner 241 may apply a low pass filter to the target temperature TT of each of the panel blocks. As the low pass filter is applied to the target temperature TT of each of the panel blocks, the target temperature determiner 241 may determine the target temperature TT of each of the panel blocks in consideration of heat transfer.

The temperature change calculator 242 may calculate the temperature change amount CT of each of the panel blocks by multiplying a difference between the target temperature TT of each of the panel blocks and the previous prediction temperature PT of each of the panel blocks determined before the reference period by a block temperature coefficient of the panel blocks.

For example, the previous prediction temperature PT of each of the panel blocks may be a predicted temperature of each of the panel blocks determined before the reference period. For example, the current prediction temperature CPT of each of the panel blocks may be a currently determined predicted temperature of each of the panel blocks.

For example, the temperature change amount CT of each of the panel blocks may be calculated by utilizing an equation Equation $$CT=BK\times(TT-PT)$$

where CT is the temperature change amount of each of the panel blocks, BK is the block temperature coefficient, PT is the previous prediction temperature, and TT is the target temperature of each of the panel blocks.

The current prediction temperature calculator 243 may calculate the current prediction temperature CPT of each of the panel blocks by adding the temperature change amount CT of each of the panel blocks to the previous prediction temperature PT of each of the panel blocks.

For example, the current prediction temperature CPT of each of the panel blocks may be calculated utilizing an equation Equation $$CBT=PT+CT$$

where CBT is the current prediction temperature of each of the panel blocks, PT is the previous prediction temperature of each of the panel blocks, and CT is the temperature change amount of each of the panel blocks.

The final temperature calculator 244 may calculate the final prediction temperature FPT by adding the current prediction temperature CPT to the ambient temperature AT.

Figure 4:
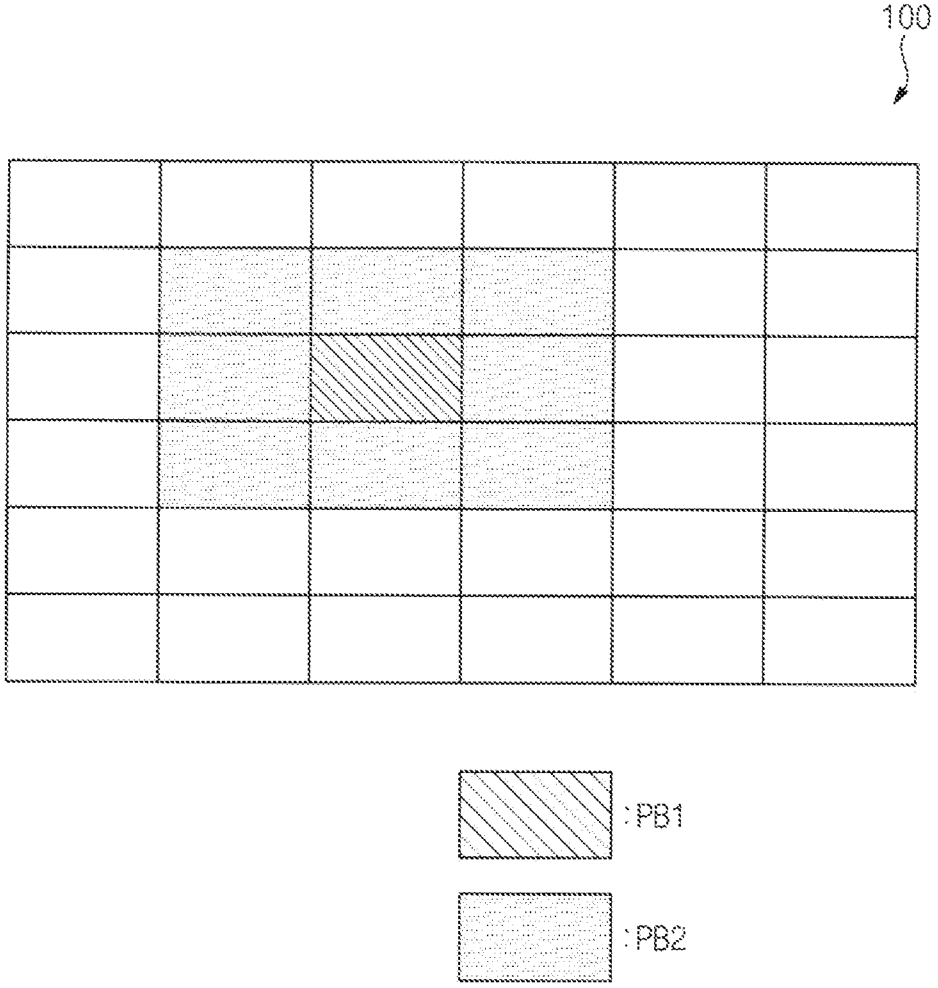
FIG. 4 is a diagram illustrating an example of a display panel of the display device of FIG. 1 according to an embodiment of the present disclosure.

FIG. 4 is a diagram illustrating an example of the display panel 100 of the display device 1000 of FIG. 1.

Referring to FIGS. 1 to 4, the panel blocks may include a first panel block (e.g., a first panel block circuit) PB1 and plural second panel blocks (second panel block circuits) PB2 adjacent to the first panel block PB1, and the block temperature coefficient of the first panel block PB1 may be determined based on the target temperature TT of the first panel block PB1 and the target temperature TT of each of the second panel blocks PB2.

For example, the temperature change amount CT of each of the panel blocks may be calculated utilizing an equation Equation $$CT=BK\times(TT-PT)$$

where CT is the temperature change amount of each of the panel blocks, BK is the block temperature coefficient, PT is the previous predicted temperature, and TT is the target temperature of each of the panel blocks. The block temperature coefficient of the first panel block PB1 may increase as a difference between the target temperature TT of the first panel block PB1 and the target temperature TT of each of the second panel blocks PB2 increases.

For example, a relatively high block temperature coefficient may be applied to the panel block with a large temperature difference from nearby panel blocks. Therefore, the display device 1000 may predict the temperature in consideration of the heat transfer.

Figure 5:
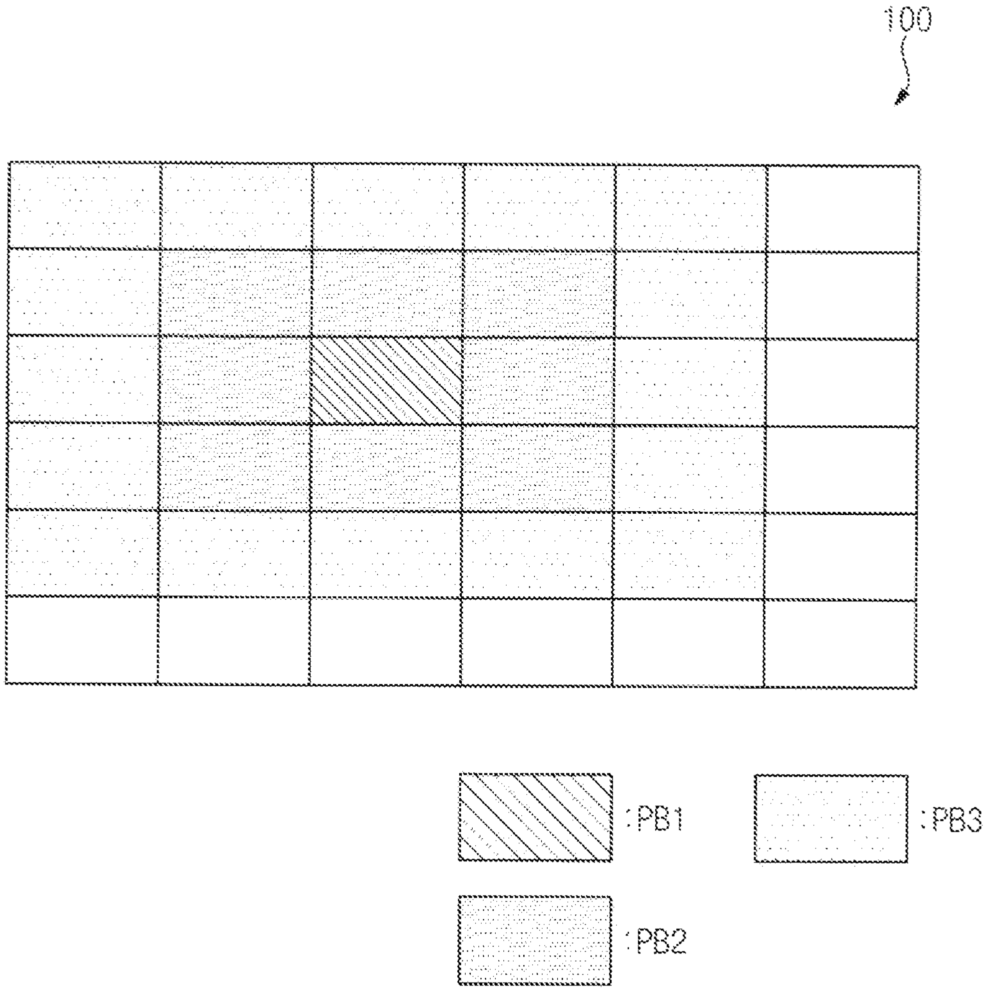
FIG. 5 is a diagram illustrating an example of a display panel of a display device according to embodiments of the present disclosure.

FIG. 5 is a diagram illustrating an example of the display panel 100 of a display device according to embodiments of the present disclosure.

The display device according to the present embodiment is substantially the same as the display device 1000 of FIG. 1 except for consider a third panel block (e.g., a third panel block circuit) PB3. Thus, the same reference numerals are utilized to refer to the same or similar element, and any repetitive explanation will not be provided.

Referring to FIGS. 1 to 3, and 5, the panel blocks may further include the third panel blocks PB3 different from the first panel block PB1 and adjacent to the second panel blocks PB2. The block temperature coefficient of the first panel block PB1 may be determined based on the target temperature TT of the first panel block PB1, the target temperature TT of each of the second panel blocks PB2, and the target temperature TT of each of the third panel blocks PB3.

For example, the temperature change amount CT of each of the panel blocks may be calculated utilizing an equation Equation $$CT=BK\times(TT-PT)$$

where CT is the temperature change amount of each of the panel blocks, BK is the block temperature coefficient, PT is the previous prediction temperature, and the TT is the target temperature of each of the panel blocks. The block temperature coefficient of the first panel block PB1 may increase as a difference between the target temperature TT of the first panel block PB1 and the target temperature TT of each of the second panel blocks PB2 increases, and the block temperature coefficient of the first panel block PB1 may increase as a difference between the target temperature TT of the first panel block PB1 and the target temperature of each of the third panel blocks PB3 increases.

For example, a relatively high block temperature coefficient may be applied to the panel block with a large temperature difference from nearby panel blocks. Therefore, the display device may predict the temperature in consideration of the heat transfer.

Figure 6:
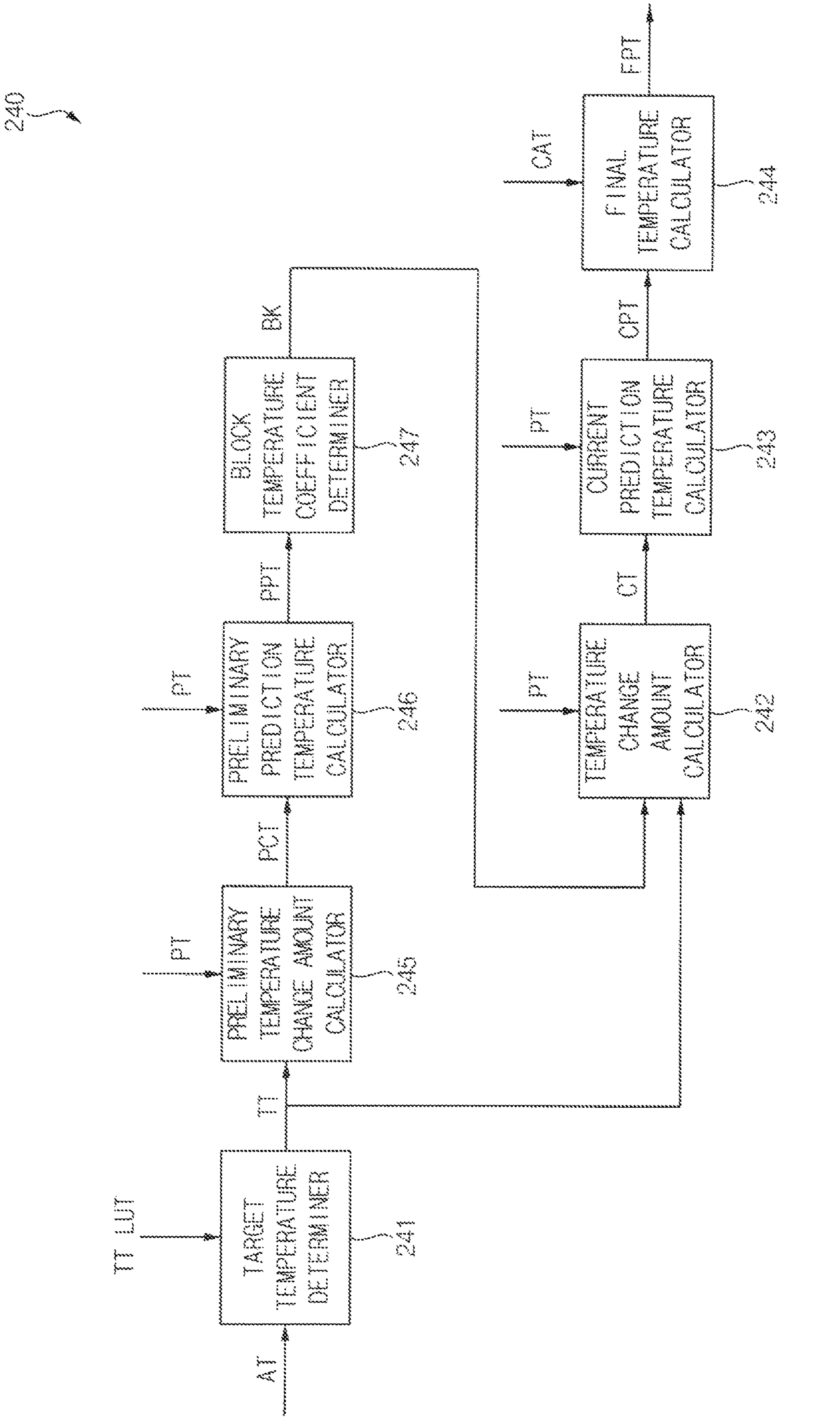
FIG. 6 is a diagram illustrating an example of a temperature predictor of a display device according to embodiments of the present disclosure.

FIG. 6 is a diagram illustrating an example of a temperature predictor (e.g., a temperature predictor cirucit) 240 of a display device according to embodiments of the present disclosure.

The display device according to the present embodiment is substantially the same as the display device 1000 of FIG. 1 except for a preliminary temperature change amount calculator (e.g., circuit) 245, a preliminary prediction temperature calculator 246 (e.g., circuit), and a block temperature coefficient determiner (e.g., circuit) 247. Thus, the same reference numerals are utilized to refer to the same or similar element, and any repetitive explanation will not be provided.

Referring to FIGS. 1, 2, and 6, the timing controller 200 may calculate a preliminary temperature change amount PCT of each of the panel blocks by multiplying a difference between the target temperature TT of each of the panel blocks and the previous prediction temperature PT of each of the panel blocks by a preset global temperature coefficient, calculate a preliminary prediction temperature PPT of each of the panel blocks by adding the preliminary temperature change amount PCT of each of the panel blocks to the previous prediction temperature PT of each of the panel blocks, and determine the block temperature coefficient BK of each of the panel blocks based on the preliminary prediction temperature PPT of each of the panel blocks.

Referring to FIG. 6, the temperature predictor 240 may further include the preliminary temperature change amount calculator 245, the preliminary prediction temperature calculator 246, and the block temperature coefficient determiner 247.

The preliminary temperature change amount calculator 245 may calculate the preliminary temperature change amount PCT of each of the panel blocks by multiplying the difference between the target temperature TT of each of the panel blocks and the previous prediction temperature PT of each of the panel blocks by the preset global temperature coefficient. Unlike the block temperature coefficient, the global temperature coefficient may not vary according to temperatures of nearby panel blocks.

The preliminary prediction temperature calculator 246 may calculate the preliminary prediction temperature PPT of each of the panel blocks by adding the preliminary temperature change amount PCT of each of the panel blocks to the previous prediction temperature PT of each of the panel blocks.

The block temperature coefficient determiner 247 may determine the block temperature coefficient BK of each of the panel blocks based on the preliminary prediction temperature PPT of each of the panel blocks.

For example, calculation of the preliminary predicted temperature PPT may be the same as calculation of the current prediction temperature CPT except that the global temperature coefficient is utilized.

Referring to FIGS. 4 and 6, in an embodiment, the block temperature coefficient BK of the first panel block PB1 may be determined based on the preliminary prediction temperature PPT of the first panel block PB1 and the preliminary prediction temperature PPT of each of the second panel blocks PB2. For example, the block temperature coefficient of the first panel block PB1 may increase as a difference between the preliminary prediction temperature PPT of the first panel block PB1 and the preliminary prediction temperature PPT of each of the second panel blocks PB2 increases.

Referring to FIGS. 5 and 6, in another embodiment, the block temperature coefficient BK of the first panel block PB1 may be determined based on the preliminary prediction temperature PPT of the first panel block PB1, the preliminary prediction temperature PPT of each of the second panel blocks PB2, and the preliminary prediction temperature PPT of each of the third panel blocks PB3. The block temperature coefficient BK of the first panel block PB1 may increase as a difference between the preliminary prediction temperature PPT of the first panel block PB1 and the preliminary prediction temperature PPT of each of the second panel blocks PB2 increases, and the block temperature coefficient BK of the first panel block PB1 may increase as a difference between the preliminary prediction temperature PPT of the first panel block PB1 and the preliminary prediction temperature PPT of each of the third panel blocks PB3 increases.

For example, the display device may utilize the target temperature TT and the global temperature coefficient to obtain a temperature difference with nearby panel blocks. And, the display device may determine the block temperature coefficient BK of each of the panel blocks based on the temperature difference, and predict the temperature in consideration of the heat transfer.

Figures 7, 8:
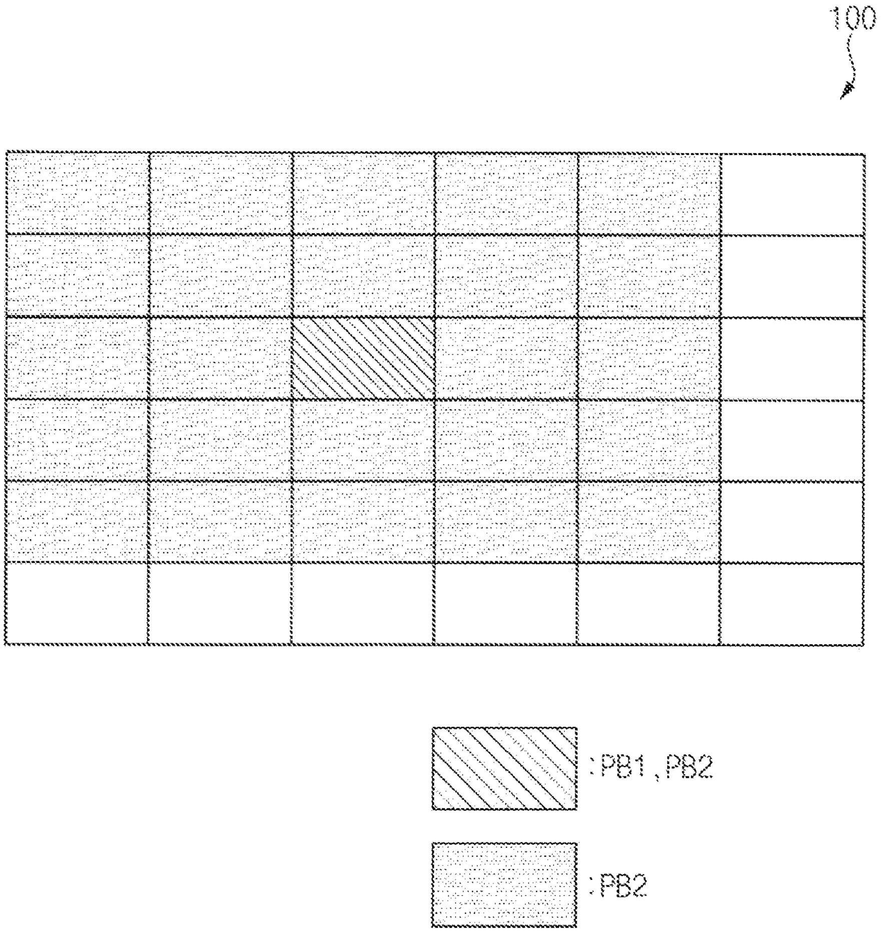
FIG. 7 is a diagram illustrating an example of a low pass filter of a display device according to embodiments of the present disclosure.
FIG. 8 is a diagram illustrating an example of a display panel of the display device of FIG. 7 according to an embodiment of the present disclosure.
Figure 9:
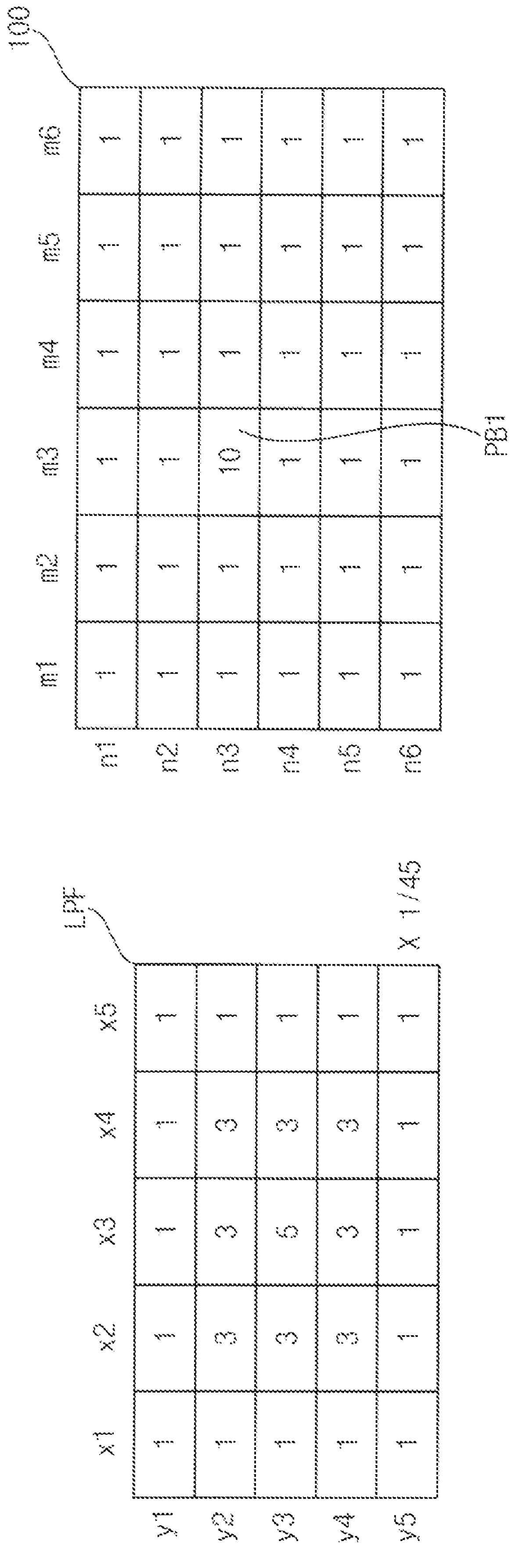
FIG. 9 is a diagram illustrating an example in which the display device of FIG. 7 determines a block temperature coefficient of a first panel block by utilizing a low pass filter according to an embodiment of the present disclosure.

FIG. 7 is a diagram illustrating an example of the low pass filter LPF of a display device according to embodiments of the present disclosure, FIG. 8 is a diagram illustrating an example of the display panel 100 of the display device of FIG. 7, and FIG. 9 is a diagram illustrating an example in which the display device of FIG. 7 determines the block temperature coefficient BK of the first panel block PB1 by utilizing the low pass filter LPF. Numbers of the low pass filter LPF of FIGS. 7 and 9 are filter values of the low-pass filter LPF, and numbers of the panel blocks of FIGS. 8 and 9 are the preliminary prediction temperature PPT of each of the panel blocks.

The display device according to the present embodiment is substantially the same as the display device of FIG. 6 except for determining the panel blocks and the block temperature coefficient BK. Thus, the same reference numerals are utilized to refer to the same or similar element, and any repetitive explanation will not be provided.

Referring to FIGS. 6 to 8, the panel blocks may include the first panel block PB1 and second panel blocks PB2 included in a range of the low pass filter LPF when the low pass filter LPF is applied to the first panel block PB1. The block temperature coefficient BK of the first panel block PB1 may be determined based on the target temperature TT of the first panel block PB1 and the target temperature TT of each of the second panel blocks PB2.

For example, the low pass filter LPF may have 25 filter values. A size of the low pass filter LPF may be 5×5. In this case, the first panel block PB1 and the second panel blocks PB2 may be the same as in FIG. 8.

The timing controller 200 may generate a first preliminary temperature coefficient for each of the second panel blocks PB2 having the preliminary prediction temperature PPT equal to or higher than the preliminary prediction temperature PPT of the first panel block PB1 utilizing an equation $$PTC1 = K \times \frac{PPT2}{PPT1} \times \frac{LPF}{MLPF} \quad \text{Equation}$$

the timing controller 200 may generate a second preliminary temperature coefficient for each of the second panel blocks PB2 having the preliminary prediction temperature PPT lower than the preliminary prediction temperature PPT of the first panel block PB1 utilizing an equation $$PTC2 = K \times \frac{PPT1}{PPT2} \times \frac{LPF}{MLPF} \quad \text{Equation}$$

and the timing controller 200 may calculate the block temperature coefficient BK of the first panel block PB1 by summing the first preliminary temperature coefficient and the second preliminary temperature coefficient, where PTC1 is the first preliminary temperature coefficient, PTC2 is the second preliminary temperature coefficient, K is the global temperature coefficient, and LPF is a filter value applied to each of the second panel blocks among the filter values of the low pass filter, and MLPF is a maximum value among the filter values of the low pass filter.

FIGS. 6 and 9, it is assumed that K is 1. The second panel blocks PB2 of FIG. 9 may have a lower preliminary predicted temperature PPT than the first panel blocks PB1 except for (m3, n3) panel block. So, the second preliminary temperature coefficient for (m1, n1), (m2, n1), (m3, n1), (m4, n1), (m5, n1), (m1, n2), (m5, n2), (m1, n3), (m5, n3), (m1, n4), (m5, n4), (m1, n5), (m2, n5), (m3, n5), (m4, n5), and (m5, n5) panel blocks may be 1*10/1*1/5=2. And, the second preliminary temperature coefficient for (m2, n2), (m3, n2), (m4, n2), (m2, n3), (m4, n3), (m2, n4), (m3, n4), and (m4, n4) panel blocks may be 1*10/1*3/5=6. The first preliminary temperature coefficient for (m3, n3) panel block may be 1*10/10*5/5=1. Accordingly, the block temperature coefficient BK of the first panel block PB1 may be (2*16) ±(3*8)+(1*1)=57.

For example, a relatively high block temperature coefficient may be applied to the panel block with a large temperature difference from nearby panel blocks. Therefore, the display device may predict the temperature in consideration of the heat transfer.

Figure 10:
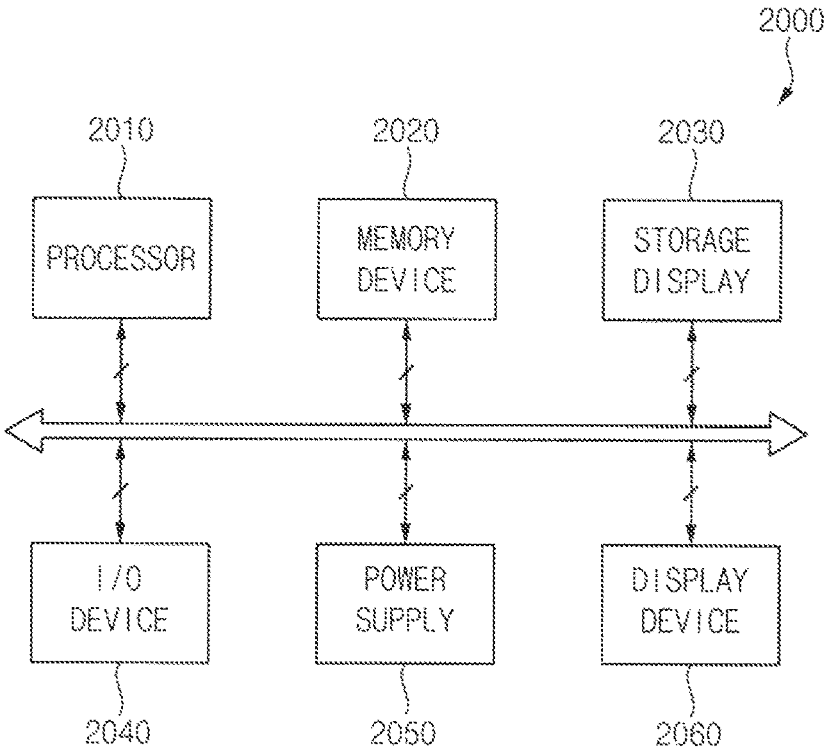
FIG. 10 is a block diagram showing an electronic device according to embodiments of the present disclosure.
Figure 11:
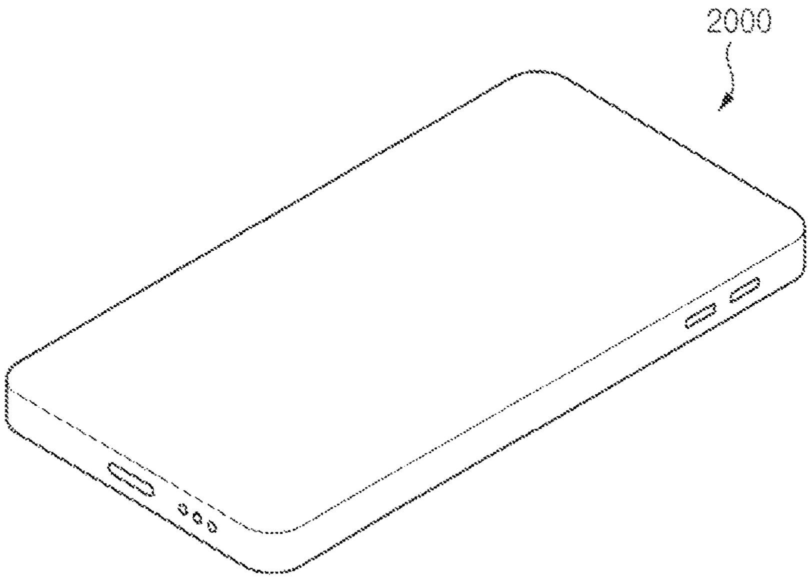
FIG. 11 is a diagram showing an example in which the electronic device of FIG. is implemented as a smart phone according to an embodiment of the present disclosure.

FIG. 10 is a block diagram showing an electronic device according to embodiments of the present disclosure, and FIG. 11 is a diagram showing an example in which the electronic device of FIG. 10 is implemented as a smart phone.

Referring to FIGS. 10 and 11, the electronic device 2000 may include a processor 2010, a memory device 2020, a storage device 2030, an input/output (I/O) device 2040, a power supply 2050, and a display device 2060. Here, the display device 2060 may be the display device 1000 of FIG.

1. In some embodiments, the electronic device 2000 may further include a plurality of ports for communicating with a video card, a sound card, a memory card, a universal serial bus (USB) device, other electronic devices, etc. In an embodiment, as shown in FIG. 11, the electronic device 2000 may be implemented as a smart phone. However, the electronic device 2000 is not limited thereto. For example, the electronic device 2000 may be implemented as a cellular phone, a video phone, a smart pad, a smart watch, a tablet PC, a car navigation system, a computer monitor, a laptop, a head mounted display (HMD) device, etc.

The processor 2010 may perform one or more suitable computing functions. The processor 2010 may be a micro processor, a central processing unit (CPU), an application processor (AP), etc. The processor 2010 may be coupled to other components via an address bus, a control bus, a data bus, etc. Further, the processor 2010 may be coupled to an extended bus such as a peripheral component interconnection (PCI) bus.

The memory device 2020 may store data for operations of the electronic device 2000. For example, the memory device 2020 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc and/or at least one volatile memory device such as a dynamic random access memory (DRAM) device, a static random access memory (SRAM) device, a mobile DRAM device, etc.

The storage device 2030 may include a solid state drive (SSD) device, a hard disk drive (HDD) device, a CD-ROM device, etc.

The I/O device 2040 may include an input device such as a keyboard, a keypad, a mouse device, a touch pad, a touch screen, etc, and an output device such as a printer, a speaker, etc. In some embodiments, the I/O device 2040 may include the display device 2060.

The power supply 2050 may provide power for operations of the electronic device 2000. For example, the power supply 2050 may be a power management integrated circuit (PMIC).

The display device 2060 may display an image corresponding to visual information of the electronic device 2000. For example, the display device 2060 may be an organic light emitting display device or a quantum dot light emitting display device, but is not limited thereto. The display device 2060 may be coupled to other components via the buses or other communication links. Here, the display device 2060 may predict the temperature of the display panel in consideration of the heat transfer.

In an embodiment, the display device 2060 may include the display panel including the panel blocks, and the timing controller determining the target temperature of each of the panel blocks based on the average luminance of each of the panel blocks, calculating the temperature change amount of each of the panel blocks by multiplying the difference between the target temperature of each of the panel blocks and the previous prediction temperature of each of the panel blocks determined before the reference period by the block temperature coefficient of the panel blocks, calculating the current prediction temperature of each of the panel blocks by adding the temperature change amount of each of the panel blocks to the previous prediction temperature of each of the panel blocks, and compensating for the input image data based on the current prediction temperature of each of the panel blocks, the panel blocks may include the first panel block and the second panel blocks adjacent to the first panel block, and the block temperature coefficient of the first panel block may be determined based on the target temperature of the first panel block and the target temperature of each of the second panel blocks. Because these are described with reference to FIGS. 1 to 6, duplicated description related thereto will not be repeated.

In another embodiment, the display device 2060 may include the display panel including the panel blocks, and the timing controller determining the target temperature of each of the panel blocks based on the average luminance of each of the panel blocks, calculating the temperature change amount of each of the panel blocks by multiplying the difference between the target temperature of each of the panel blocks and the previous prediction temperature of each of the panel blocks determined before the reference period by the block temperature coefficient of the panel blocks, calculating the current prediction temperature of each of the panel blocks by adding the temperature change amount of each of the panel blocks to the previous prediction temperature of each of the panel blocks, and compensating for the input image data based on the current prediction temperature of each of the panel blocks, the panel blocks may include the first panel block and the second panel blocks included in the range of the low pass filter when the low pass filter is applied to the first panel block, and the block temperature coefficient of the first panel block may be determined based on the target temperature of the first panel block and the target temperature of each of the second panel blocks. Because these are described with reference to FIGS. 7 to 9, duplicated description related thereto will not be repeated.

The present disclosure may be applied to any electronic device including the display device. For example, the present disclosure may be applied to a television (TV), a digital TV, a 3D TV, a mobile phone, a smart phone, a tablet computer, a virtual reality (VR) device, a wearable electronic device, a personal computer (PC), a home appliance, a laptop computer, a personal digital assistant (PDA), a portable multimedia player (PMP), a digital camera, a music player, a portable game console, a navigation device, etc.

The display device and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of the device may be formed on one integrated circuit (IC) chip or on separate IC chips. Further, the various components of the [device] may be implemented on a flexible printed circuit film, a tape carrier package (TCP), a printed circuit board (PCB), or formed on one substrate. Further, the various components of the device may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the scope of the example embodiments of the present invention.

As used herein, the singular forms "a", "an" and "the" are intended to include the plural forms as well, unless the context clearly indicates otherwise. Further, the use of "may" when describing embodiments of the present disclosure refers to "one or more embodiments of the present disclosure."

The foregoing is illustrative of the present disclosure and is not to be construed as limiting thereof. Although a few example embodiments of the present disclosure have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims. In the claims, means-plus-function clauses are intended to cover the structures described herein as performing the recited function and not only structural equivalents but also equivalent structures. Therefore, it is to be understood that the foregoing is illustrative of the present disclosure and is not to be construed as limited to the specific example embodiments disclosed, and that modifications to the disclosed example embodiments, as well as other example embodiments, are intended to be included within the scope of the appended claims. The present disclosure is defined by the following claims and equivalents thereof, with equivalents of the claims to be included therein.

What is claimed is:

1. A display device comprising:

a display panel comprising a plurality of panel blocks; and a timing controller configured to:

determine a target temperature of each of the panel blocks based on an average luminance of each of the panel blocks;

calculate a temperature change amount of each of the panel blocks by multiplying a difference between the target temperature of each of the panel blocks and a previous prediction temperature of each of the panel blocks determined before a reference period by a block temperature coefficient of the panel blocks;

calculate a current prediction temperature of each of the panel blocks by adding the temperature change amount of each of the panel blocks to the previous prediction temperature of each of the panel blocks; and compensate for input image data based on the current prediction temperature of each of the panel blocks, wherein the panel blocks include a first panel block and a plurality of second panel blocks adjacent to the first panel block, and wherein the block temperature coefficient of the first panel block is determined based on the target temperature of the first panel block and the target temperature of each of the second panel blocks.

2. The display device of claim 1, wherein the block temperature coefficient of the first panel block increases as a difference between the target temperature of the first panel block and the target temperature of each of the second panel blocks increases.

3. The display device of claim 1, wherein the panel blocks further include a plurality of third panel blocks different from the first panel block and adjacent to the second panel blocks, and wherein the block temperature coefficient of the first panel block is determined based on the target temperature of the first panel block, the target temperature of each of the second panel blocks, and the target temperature of each of the third panel blocks.

4. The display device of claim 3, wherein the block temperature coefficient of the first panel block increases as a difference between the target temperature of the first panel block and the target temperature of each of the second panel blocks increases, and wherein the block temperature coefficient of the first panel block increases as a difference between the target temperature of the first panel block and the target temperature of each of the third panel blocks increases.

5. The display device of claim 1, wherein the timing controller is further configured to:

calculate a preliminary temperature change amount of each of the panel blocks by multiplying a difference between the target temperature of each of the panel blocks and the previous prediction temperature of each of the panel blocks by a preset global temperature coefficient;

calculate a preliminary prediction temperature of each of the panel blocks by adding the preliminary temperature change amount of each of the panel blocks to the previous prediction temperature of each of the panel blocks; and determine the block temperature coefficient of each of the panel blocks based on the preliminary prediction temperature of each of the panel blocks.

6. The display device of claim 5, wherein the block temperature coefficient of the first panel block is determined based on the preliminary prediction temperature of the first panel block and the preliminary prediction temperature of each of the second panel blocks.

7. The display device of claim 6, wherein the block temperature coefficient of the first panel block increases as a difference between the preliminary prediction temperature of the first panel block and the preliminary prediction temperature of each of the second panel blocks increases.

8. The display device of claim 6, wherein the panel blocks further include a plurality of third panel blocks different from the first panel block and adjacent to the second panel blocks, and wherein the block temperature coefficient of the first panel block is determined based on the preliminary prediction temperature of the first panel block, the preliminary prediction temperature of each of the second panel blocks, and the preliminary prediction temperature of each of the third panel blocks.

9. The display device of claim 8, wherein the block temperature coefficient of the first panel block increases as a difference between the preliminary prediction temperature of the first panel block and the preliminary prediction temperature of each of the second panel blocks increases, and wherein the block temperature coefficient of the first panel block increases as a difference between the preliminary prediction temperature of the first panel block and the preliminary prediction temperature of each of the third panel blocks increases.

10. The display device of claim 1, wherein the timing controller is configured to store an accumulated deterioration amount generated by accumulating a deterioration amount of each of the panel blocks according to grayscale values of the input image data, and wherein the average luminance increases as a change amount of the accumulated deterioration amount during the reference period increases.

11. The display device of claim 1, wherein the timing controller is configured to determine the target temperature using a target temperature lookup table comprising the target temperature corresponding to the average luminance.

12. The display device of claim 11, wherein the timing controller is configured to apply a low pass filter to the target temperature.

13. The display device of claim 1, further comprising:

a temperature sensor configured to sense an ambient temperature of the display panel, wherein the timing controller is configured to calculate a final prediction temperature by adding the current prediction temperature of each of the panel blocks to the ambient temperature, and to compensate for the input image data based on the final prediction temperature.

14. A display device comprising:

a display panel comprising a plurality of panel blocks; and a timing controller configured to:

determine a target temperature of each of the panel blocks based on an average luminance of each of the panel blocks;

calculate a temperature change amount of each of the panel blocks by multiplying a difference between the target temperature of each of the panel blocks and a previous prediction temperature of each of the panel blocks determined before a reference period by a block temperature coefficient of the panel blocks;

calculate a current prediction temperature of each of the panel blocks by adding the temperature change amount of each of the panel blocks to the previous prediction temperature of each of the panel blocks; and compensate for input image data based on the current prediction temperature of each of the panel blocks, wherein the panel blocks include a first panel block and a plurality of second panel blocks included in a range of a low pass filter when the low pass filter is applied to the first panel block, and wherein the block temperature coefficient of the first panel block is determined based on the target temperature of the first panel block and the target temperature of each of the second panel blocks.

15. The display device of claim 14, wherein the timing controller is further configured to:

calculate a preliminary temperature change amount of each of the panel blocks by multiplying a difference between the target temperature of each of the panel blocks and the previous prediction temperature of each of the panel blocks by a preset global temperature coefficient;

calculate a preliminary prediction temperature of each of the panel blocks by adding the preliminary temperature change amount of each of the panel blocks to the previous prediction temperature of each of the panel blocks; and determine the block temperature coefficient of each of the panel blocks based on the preliminary prediction temperature of each of the panel blocks.

16. The display device of claim 15, wherein the block temperature coefficient of the first panel block is determined based on the preliminary prediction temperature of the first panel block and the preliminary prediction temperature of each of the second panel blocks.

17. The display device of claim 16, wherein the timing controller is configured to generate a first preliminary temperature coefficient for each of the second panel blocks having the preliminary prediction temperature equal to or higher than the preliminary prediction temperature of the first panel block using an equation $$PTC1 = K \times \frac{PPT2}{PPT1} \times \frac{LPF}{MLPF},$$

wherein the timing controller is configured to generate a second preliminary temperature coefficient for each of the second panel blocks having the preliminary prediction temperature lower than the preliminary prediction temperature of the first panel block using an equation $$PTC2 = K \times \frac{PPT1}{PPT2} \times \frac{LPF}{MLPF},$$

and wherein the timing controller is configured to calculate the block temperature coefficient of the first panel block by summing the first preliminary temperature coefficient and the second preliminary temperature coefficient, where PTC1 is the first preliminary temperature coefficient, PTC2 is the second preliminary temperature coefficient, K is the global temperature coefficient, and LPF is a filter value applied to each of the second panel blocks among filter values of the low pass filter, and MLPF is a maximum value among the filter values of the low pass filter.

18. The display device of claim 14, wherein the timing controller is configured to store an accumulated deterioration amount generated by accumulating a deterioration amount of each of the panel blocks according to grayscale values of the input image data, and wherein the average luminance increases as a change amount of the accumulated deterioration amount during the reference period increases.

19. The display device of claim 14, wherein the timing controller is configured to determine the target temperature using a target temperature lookup table comprising the target temperature corresponding to the average luminance.

20. The display device of claim 14, wherein the timing controller is configured to apply the low pass filter to the target temperature.

* * * * *